Jan. 13, 1931.　　　F. E. BECKER　　　1,788,973
SPECTACLE FRAME
Filed March 13, 1928
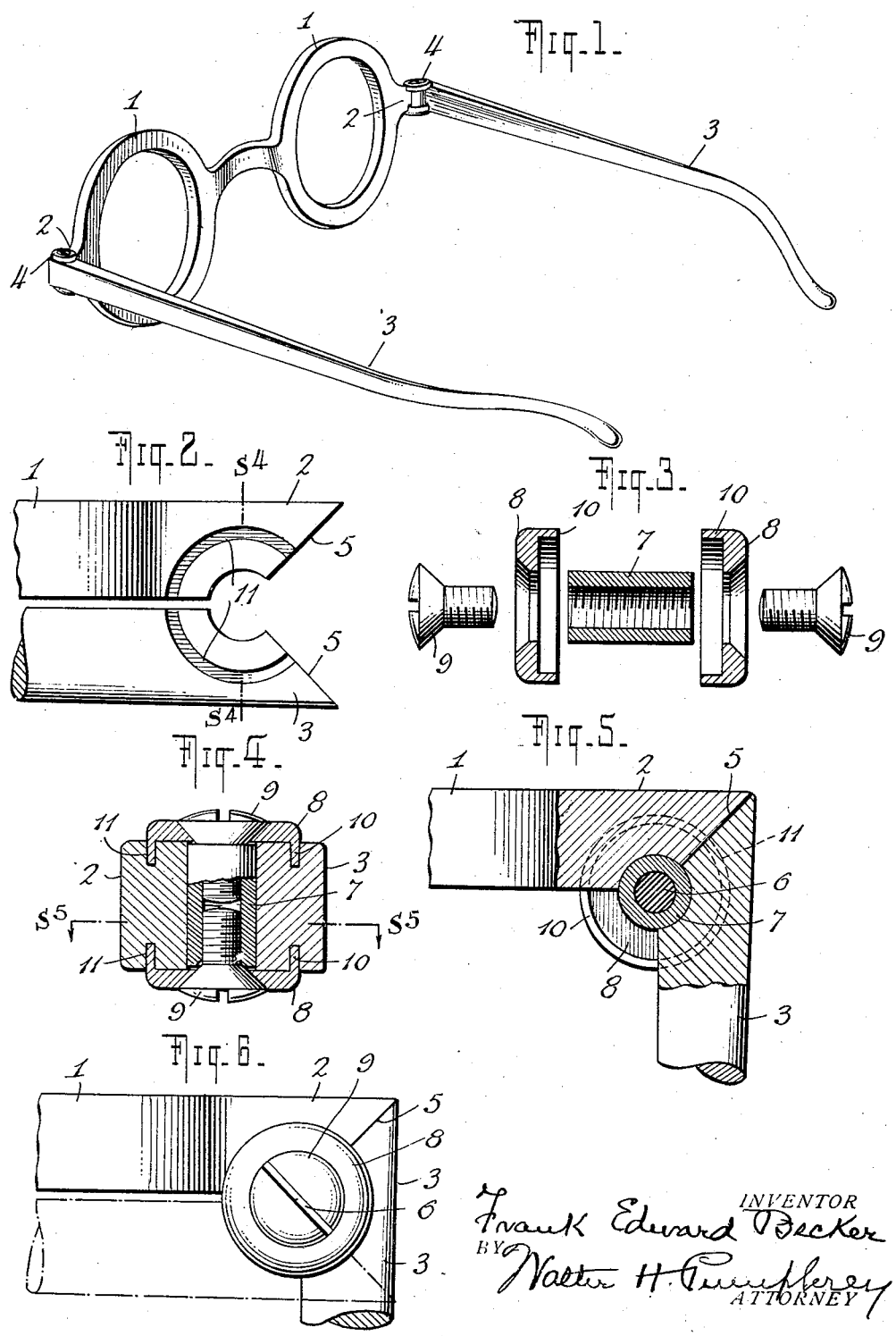
Frank Edward Becker INVENTOR
BY Walter H. Pumphrey ATTORNEY Patented Jan. 13, 1931

1,788,973

UNITED STATES PATENT OFFICE

FRANK EDWARD BECKER, OF JAMAICA, NEW YORK

SPECTACLE FRAME

Application filed March 13, 1928. Serial No. 261,370.

My invention, while not limited in its application, relates generally to ophthalmic mountings of the type formed of any of the well-known non-metallic materials, such as is now commonly employed in the trade.

More specifically, the invention has particular reference to an improved construction of hinge joint between the front ends of the temple bars of a non-metallic spectacle frame and the outer sides of the lens rims of the frame.

One of the main objects of the invention is to provide a celluloid (or equivalent) to metal bearing for the hinge joint, which has many advantages over the usual metal to metal bearing.

A further object is to so design and assemble the hinge joint, that all metal parts employed therein are readily removable, being held in position under the pressure of clamp screws and not permanently molded in or otherwise secured to the non-metallic frame.

Another feature of the invention, at times important and desirable from the view point of both the manufacturer and user, is to provide a construction which admits of making the hinge joint of the flush type, in which no metal part or parts project beyond the non-metallic frame members.

Aside from the features above mentioned there are many other points of advantage in the construction disclosed herein, which will be apparent from the following detailed description.

A construction suitable for carrying my invention into effect is illustrated in the accompanying drawings, in which—

Fig. 1 is a view in perspective showing a spectacle frame constructed in accordance with my invention;

Fig. 2 is a detail view, on an enlarged scale, of the hinged members at one side of the frame, the temple bar shown being folded down in parallel relation with the frame and the metal parts of the hinge being removed to show the shaped ends of the members;

Fig. 3 is a detail sectional view of the metal parts of the hinge which are shown in separated relation;

Fig. 4 is a cross section, as it would appear of the complete assembly, if taken on the line $s^4$, $s^4$, of Fig. 2.

Fig. 5 is a sectional view taken on the line $s^5$, $s^5$, of Fig. 4, with the hinged members in the position shown in Fig. 1, and Fig. 6 is a view in elevation thereof, with a dotted line representation of the temple bar folded down in parallel relation with the frame, the position it usually occupies when the glasses are not in use.

Referring to the drawings, 1, 1, indicate the lens rims of a spectacle frame of a type that is ordinarily formed of celluloid, zylomite or other suitable non-metallic material. The lens rims are each provided with an integral, outwardly extending lug 2, to which the front ends of the temple bars 3, 3, are attached by means of hinge joints 4, 4.

It is desirable, for many reasons, that the hinge joints be so constructed as to definitely limit movement of the temple bars to 90 degrees, so that they stand at right angles to the frame when the glasses are in use and fold downward flat across the frame, in close relation thereto, when the glasses are not in use.

This is accomplished by giving the adjoining ends of the lugs 2, and temple bars 3, a 45 degree bevel, as indicated at 5, and so designing the hinge joint that the turning center 6, thereof, is located at the upper meeting ends of the bevelled extremities of the above mentioned members.

The hinge pintle is formed by a through sleeve 7, to the exterior surface of which the lug 2 and bar 3, are shaped and fitted in bearing relation.

The above described members are secured in assembled relation by terminal washers 8, 8, and screws 9, 9, which latter are threaded in opposite ends of the pintle sleeve 7 and are provided, preferably, with conical heads which seat in similarly shaped openings in the washers.

As best shown in Figs. 3 and 4, the washers are cup-shaped—that is to say, provided with annular peripheral flanges 10, which enter grooves 11, formed in opposite sides of the lugs 2 and bars 3. The curve of the grooves 11 is concentric with the turning axis of the hinge, permitting free movement of the temple bars on the hinge pintles as bearings. Tension on the joint may be varied and regulated as desired by tightening or loosening the screws 9, 9, as will be apparent.

From the drawings it will be seen that the hinge constructed as above described, forms practically a flush joint and can be entirely freed of the slightly projecting screws and washers, if desired, by completely countersinking them in the sides of the lugs and bars, without otherwise modifying either the assembly or operation of the hinge joint described.

As the many obvious advantages of a celluloid to metal or a non-metal to metal bearing will be apparent, it will not be necessary to enumerate them.

I do not wish to be understood as intending to limit myself to the exact construction and arrangement herein shown and described, as various changes may be made therein without departing from the spirit and scope of the invention, as set forth in the appended claims. In this connection, I may mention that I have not considered it necessary to extend the disclosure herein to modifications that are at once apparent and obvious, such, for example, as combining in one piece, parts that I have shown, for convenience of illustration, as separate pieces, since the function performed and result attained would be the same whether certain parts are integrally or separately formed.

In the following claims, I shall refer for convenience of briefly identifying the lens rims and temple bars of the spectacle frame, as frame members.

Having thus described my invention, what I claim is:

1. In a non-metallic spectacle frame, a hinge joint, including a pintle providing a turning axis for relative movement of the frame members, the said frame members each having a bearing on the pintle extending substantially throughout the length of the pintle but individually embracing less than 180 degrees of its peripheral surface.

2. In a non-metallic spectacle frame, a hinge joint, including a pintle providing a turning axis for relative movement of the frame members, the said frame members each having a bearing on the pintle extending substantially throughout the length of the pintle but individually embracing less than 180 degrees of its peripheral surface, the extremities of the said frame members being oppositely bevelled to limit relative movement thereof to approximately 90 degrees.

3. In a non-metallic spectacle frame, a hinge joint including a pintle providing a turning axis for relative movement of the frame members, the said frame members each having a bearing on the pintle extending substantially throughout the length of the pintle but individually embracing less than 180 degrees of its peripheral surface, the extremities of the said frame members being oppositely bevelled to limit the movement thereof to approximately 90 degrees, and means for securing the frame mmebers and hinge pintle in operative assembled relation.

4. In a non-metallic spectacle frame, a hinge joint including a pintle providing a turning axis for relative movement of the frame members, the said frame members each having a bearing on the pintle extending substantially throughout the length of the pintle but individually embracing less than 180 degrees of its peripheral surface, the extremities of said frame members being shaped to co-act in definitely limiting the movement thereof, and means securing the frame members and hinge pintle in operative assembled relation.

5. In a non-metallic spectacle frame, a hinge joint including a pintle providing a turning axis for relative movement of the frame members, the said frame members each having a bearing on the pintle extending substantially throughout the length of the pintle but individually embracing less than 180 degrees of its peripheral surface, the extremities of said frame members extending beyond the pintle and shaped to co-act in definitely limiting the movement thereof, and means securing the frame members and hinge pintle in operative assembled relation.

I affix my signature.

FRANK EDWARD BECKER.